United States Patent
Chew et al.

(10) Patent No.: US 10,500,542 B2
(45) Date of Patent: Dec. 10, 2019

(54) METHOD AND SYSTEM FOR APPLYING SUPERIMPOSED TIME-VARYING FREQUENCY ELECTROMAGNETIC WAVE FOR REMOVAL OF $SO_X$, $CO_2$ AND $NO_X$ FROM FLUE GASES

(71) Applicant: SEMB-ECO R&D PTE LTD, Singapore (SG)

(72) Inventors: Hwee Hong Chew, Singapore (SG); Poh Kwee Ong, Singapore (SG)

(73) Assignee: Semb-Eco R&D PTE LTD, Singapore (SG)

( * ) Notice: Subject to any disclaimer, the term of this patent is extended or adjusted under 35 U.S.C. 154(b) by 88 days.

(21) Appl. No.: 15/748,524

(22) PCT Filed: Jul. 29, 2016

(86) PCT No.: PCT/SG2016/050365
§ 371 (c)(1),
(2) Date: Jan. 29, 2018

(87) PCT Pub. No.: WO2017/018947
PCT Pub. Date: Feb. 2, 2017

(65) Prior Publication Data
US 2018/0221821 A1    Aug. 9, 2018

(30) Foreign Application Priority Data
Jul. 29, 2015   (WO) ............... PCT/SG2015/050239

(51) Int. Cl.
*B01D 53/32*    (2006.01)
*B01D 53/50*    (2006.01)
(Continued)

(52) U.S. Cl.
CPC ......... *B01D 53/965* (2013.01); *B01D 53/323* (2013.01); *B01D 53/504* (2013.01);
(Continued)

(58) Field of Classification Search
None
See application file for complete search history.

(56) References Cited

U.S. PATENT DOCUMENTS

2013/0052111 A1*   2/2013   Chew .................... B01D 53/32
                                                      423/223

* cited by examiner

*Primary Examiner* — Daniel Berns
(74) *Attorney, Agent, or Firm* — Cesari and McKenna, LLP

(57) ABSTRACT

The invention relates to a method and system for treating flue gases comprising generating a superimposed DC time-varying pulsed wave by superimposing a direct current on a low frequency time-varying pulsating electromagnetic wave signal, providing a treatment medium comprising water, using the superimposed DC pulsed wave to treat the treatment water medium, negatively charging the treated treatment water medium, and passing the negatively charged treated treatment water medium into a chamber containing flue gas such that the negatively charged treated treatment water affects the gas components of the flue gas and converts the gas components respectively to one or more of sulphates, nitrogen, oxygen, bicarbonates, carbonates and carbon, which can then be removed with used treatment water or exhaust gases.
In particular, the invention relates to methods and systems for applying a superimposed time-varying frequency electromagnetic wave comprising both AC and DC components in a pulsating manner to enable the removal of pollutant gases from flue gases.

20 Claims, 10 Drawing Sheets

(51) Int. Cl.

| | | |
|---|---|---|
| *B01D 53/56* | (2006.01) | |
| *B01D 53/60* | (2006.01) | |
| *B01D 53/62* | (2006.01) | |
| *B01D 53/78* | (2006.01) | |
| *B01D 53/96* | (2006.01) | |
| *C02F 5/00* | (2006.01) | |
| *C02F 1/00* | (2006.01) | |
| *C02F 1/32* | (2006.01) | |
| *C02F 1/46* | (2006.01) | |
| *C02F 1/48* | (2006.01) | |
| *C23F 13/04* | (2006.01) | |
| *C23F 13/06* | (2006.01) | |
| *C02F 1/461* | (2006.01) | |
| *C25D 11/00* | (2006.01) | |
| *C25D 11/02* | (2006.01) | |
| *C25D 11/34* | (2006.01) | |
| *C25D 11/38* | (2006.01) | |
| *C02F 103/00* | (2006.01) | |
| *C02F 103/08* | (2006.01) | |
| *C02F 103/18* | (2006.01) | |

(52) U.S. Cl.
CPC ........... *B01D 53/507* (2013.01); *B01D 53/56* (2013.01); *B01D 53/60* (2013.01); *B01D 53/62* (2013.01); *B01D 53/78* (2013.01); *C02F 1/004* (2013.01); *C02F 1/32* (2013.01); *C02F 1/4602* (2013.01); *C02F 1/46104* (2013.01); *C02F 1/484* (2013.01); *C02F 1/487* (2013.01); *C02F 5/00* (2013.01); *C23F 13/04* (2013.01); *C23F 13/06* (2013.01); *C25D 11/005* (2013.01); *C25D 11/022* (2013.01); *C25D 11/34* (2013.01); *C25D 11/38* (2013.01); *B01D 2252/103* (2013.01); *B01D 2252/1035* (2013.01); *B01D 2257/302* (2013.01); *B01D 2257/404* (2013.01); *B01D 2257/504* (2013.01); *B01D 2258/0283* (2013.01); *C02F 2103/007* (2013.01); *C02F 2103/008* (2013.01); *C02F 2103/08* (2013.01); *C02F 2103/18* (2013.01); *C02F 2201/4614* (2013.01); *C02F 2201/46125* (2013.01); *C02F 2201/46175* (2013.01); *C02F 2201/483* (2013.01); *C02F 2303/04* (2013.01); *C02F 2303/08* (2013.01); *C02F 2303/20* (2013.01); *C23F 2213/32* (2013.01)

METHOD AND SYSTEM FOR APPLYING SUPERIMPOSED TIME-VARYING FREQUENCY ELECTROMAGNETIC WAVE FOR REMOVAL OF $SO_X$, $CO_2$ AND $NO_X$ FROM FLUE GASES

CROSS-REFERENCE TO RELATED APPLICATIONS

This application is the National Stage of International Application No. PCT/SG2016/050365, filed Jul. 29, 2016, which claims the benefit of priority of International Application No. PCT/SG2015/050239, filed Jul. 29, 2015, the contents of both being incorporated by reference in their entirety for all purposes.

FIELD OF THE INVENTION

This invention relates generally to the field of treatment of an object or a region in order to utilize one or more treatment effects. More particularly, the invention relates to methods and systems for applying a superimposed time-varying frequency electromagnetic wave comprising both AC and DC components in a pulsating manner to treat flue gases to remove pollutant gases.

BACKGROUND OF THE INVENTION

There are many methods available in the market for scrubbing flue gases to remove pollutant gases and common methods available in the market may be classified in the following few categories:—
1. Chemical neutralizing scrubbing methods, either using alkali chemicals such as NaOH, MgO, CaO, or using seawater bicarbonates/carbonates to neutralize the acid gases.
2. Urea Selective Catalytic Reduction (SCR) methods, which reduce NOx.
3. Carbon Capture and Storage (CCS) methods, which bury or store $CO_2$ (this is not a removal process).
4. DC electrolysis and time-varying electromagnetic wave treatments.

Each of the above methods has certain deficiencies and either are impractical to implement or are unable to solve environmental problems completely, hence limiting their application as "Total Green Solutions".

Chemical neutralizing scrubbing methods are used to remove SOx gases. However, they create secondary pollution problems such as acidifying the seawater, emission of $CO_2$ in the process of producing the scrubbing chemicals such as CaO, and generation of more $CO_2$ in the scrubbing of SOx when using seawater. Additionally, the disposal of the chemical reaction end products is always a major environmental issue.

SCR methods only remove NOx and are unable to remove SOx or $CO_2$. Additionally, the catalyst of the SCR is easily poisoned by $SO_2$ in the flue gases and this makes SCR difficult to implement in gases containing $SO_2$.

CCS methods do not actually remove $CO_2$. They specifically are storage methods and cannot be considered as pollutant removal processes. In practice, they may actually emit more $CO_2$ in the storage process and they also require SOx to be removed first.

DC electrolysis and time-varying electromagnetic wave treatments cover a variety of different methods. Sukheon An and Osami Nishida (JSME International Journal Series B, Volume 46, Issue 1, pp. 206-213 (2003)) teach the use of DC electrolysis to remove SOx, $CO_2$ and NOx gases by a chemical neutralization process using the chemicals produced in a DC electrolysis process. However, in this DC electrolysis process, the anode water becomes very acidic and causes severe corrosion and disposal issues.

WO2010/139114 (which describes open loop methods) and WO2011/147085 (which describes closed loop methods) describe the use of DC electrolysis and time-varying electromagnetic wave methods to remove SOx, $CO_2$ and NOx.

As described in WO2010/139114, $SO_2$ is removed by a chemical neutralizing process using pre-electrolyzed alkaline water. The removal of $CO_2$ and NOx is by way of electrolyzing and the use of time-varying electromagnetic treated water to break the $CO_2$ into C and $O_2$ and NOx into $N_2$ and $O_2$.

In both WO2010/139114 and WO2011/147085, the gas removal function is performed by the DC electrolysis process which generates an electrolysis plasma in the water. The alkali-producing treatment effect in the DC electrolysis is also used to maintain the water pH in the respective alkaline stages. However, DC electrolysis has a major disadvantage in many applications in that when it takes place in fresh water or seawater, inevitably hydrogen gas and chlorine/hypochlorite will be generated. While chlorine/chlorite can be eliminated if magnesium is used as the anode material, hydrogen gas generation is inevitable. Additionally, if a magnesium electrode is used, it is consumable and a high cost is incurred. Hydrogen gas and chlorine gas generation are both hazardous due to their explosive and toxic properties which are highly undesirable for industrial applications especially in marine oil tankers, LNG carriers, refineries or other safety sensitive applications.

In WO2010/139114, the use of a time-varying electromagnetic treatment is based on the disclosure of PCT/SG2006/000218. In this disclosure, the time-varying electromagnetic wave is a pure AC wave and it uses an indirect inductor coil external field treatment method to treat the water. This time-varying electromagnetic wave treatment using a pure AC pulsed wave to energize the inductor coils or emitter is unable to control the pH. In practice, no perfect plasmatic gas phase reaction can take place when water is in contact with sour gas so inevitably a side liquid phase reaction will take place and the water will gradually become acidic, although at a slower rate.

WO2011/147085 has a first stage which operates at a very acidic condition of pH 2~4, which is highly corrosive. This requires special alloy materials for the scrubbing towers, pumps, electrodes, associated piping materials and tanks etc. The teaching of WO2011/147085 is based on the principle of using a "fully saturated" solution to promote the gas-breaking reaction and preventing the SOx, $CO_2$ and NOx from entering into the water medium. When a fully saturated solution is Used, precipitation of solutes takes place easily and they will choke up nozzles, pipes etc.

Another drawback of the disclosure of WO2011/147085 is that the breaking of $SO_2$ into S and $O_2$ creates another environmental issue due to the difficulty of storing and disposing of sulphur produced from the breaking process, especially for marine or shipboard applications.

Yet another drawback of the disclosure of WO2011/147085 is that the scrubbing of SOx, NOx and $CO_2$ needs to be carried out in three different stages and these three stages are supposed to be separated and operate as three independent systems with their own specific scrubbing media and operating conditions. This is because the removal of SOx, NOx and $CO_2$ as described in WO2011/147085 respectively requires a different set of reaction environment conditions and it is important that they should not be cross-contaminated. Once contaminated, the reaction environment is changed and gas removal performance is compromised. In actual practice, as the three stages described in WO2011/147085 share the same common gas path for the scrubbing processes, the media used in the three stages will be carried over and contamination will happen. Critically, when the first stage acidic pH medium is carried over to the alkaline environment of stages 2 and 3, the stage 2 and 3 pH condition is changed and the chemical composition of each buffer medium is changed too. This leads to a deterioration in performance and, in practice, it is difficult to eradicate contamination between three separate reaction environment sensitive systems if they are installed in one common vertical pass gas path axis, hence limiting application of the three-stage method in many industries.

More precisely, WO2011/147085 teaches that SOx, $CO_2$ or NOx gas can only be removed one gas at a time in separate stages as it needs a specific critical reaction environment and condition to remove each particular gas. In the method however all three gases are removed in one processing tower. This comprises the three different stages and does not remove the gases simultaneously.

It has been always a challenge to develop alternative technologies for obtaining various treatment effects that are effective and cause no harm to the environment. Therefore, there is a need for new methods and systems that are capable of carrying out effective removal of pollutant gases from flue gases and that do not cause harm to the atmosphere or surrounding environments.

The listing or discussion of an apparently prior-published document in this specification should not necessarily be taken as an acknowledgement that the document is part of the state of the art or is common general knowledge.

SUMMARY OF THE INVENTION

The present invention has been developed to fulfill the needs noted above and therefore has the advantage of providing a system for applying a superimposed time-varying frequency electromagnetic wave to a target object or a target region which is environmentally sound and does not leach chemicals products into the surroundings. The present invention utilizes the methods and systems described in the application from which this application claims priority, and further provides specific methods and systems for removing pollutant gases from flue gases.

Another advantage of the invention is that it can provide methods and systems for removing pollutant gases from flue gases which are significantly more economical and convenient to utilize than the prior art.

An advantage of the invention is that is provides a method and system that can remove SOx, NOx and $CO_2$ simultaneously using one common medium yet without generating hydrogen and chlorine gas. Additionally the invention is able to provide a practical and industrially implementable solution that is able to achieve a "Total Green Solution" for users.

The invention provides a method for treating flue gases in accordance with claim 1 of the appended claims. The invention further provides a flue gas treatment system in accordance with claim 19 of the appended claims.

Instead of creating three different specific environments for the removal of each of SOx, $CO_2$ and NOx as described in WO2011/147085, the three types of gases are removed by one common medium under one common environment and under the same reaction conditions. Preferably, the treatment medium is operated under near-neutral to alkaline conditions with a pH range from 6 to 12 to avoid acidic corrosion or high alkaline corrosion issues, although the non-acidic gas phase reaction is still able to take place at a pH of less than 6 or exceeding 12. The medium used can be fresh water, sea water, river water, lake water, bore well water or water from any suitable supply source. The water may be used directly without the addition of chemicals for gas removal by the superimposed DC time-varying pulsed wave treatment of the invention, but gas removal and pH stability maintenance efficacy can be enhanced if sulphates, bicarbonates, carbonates or nitrate based chemicals such as $Na_2CO_3$, $NaHCO_3$, $Na_2SO_4$, for example, are added either singly or in combination. The addition concentration of these chemicals need not to be fully saturated. Typically, a concentration of a few percent of these chemicals will enhance the performance and the preferred concentration can be optimized on-site depending on the water source quality and the gas load and composition. For convenience, the medium may be prepared by pre-mixing water with chemicals, such as about 1 to 25% $Na_2CO_3$, with or without about 1 to 25% $Na_2SO_4$. In the subsequent continuous operation of the system, the sulphates and carbonates ions/alkalinity are progressively replenished in the medium over time by the minor side liquid phase reactions of the scrubbing processes of the SOx and $CO_2$ gases. In the initial pre-mixing chemical addition, other positive ion sulphates and carbonates may be used, such as magnesium, calcium etc. but their tendency to precipitate in the scrubbing process must be taken into account.

The present invention uses a superimposed DC time-varying pulsed wave which has a superior performance to that of pure AC. The invention enables only one scrubbing medium to be used, yet it is able to remove SOx, $CO_2$ and NOx in one stage instead of the three stages required by the prior art. Additionally, the superimposed DC time-varying pulsed wave is able to correct the water pH to a more alkaline level without the need for any separate DC electrolysis. Further, the superimposed DC time-varying pulsed wave can also be controlled such that no hydrogen gas or chlorine gas is generated.

When using DC electrolysis in seawater, even at very low driving voltages, chlorine gas will be generated at the anode side and hydrogen will be generated at the cathode side. However, the superimposed DC time-varying frequency wave can be controlled such that no chlorine or hydrogen gas is generated and such an effect is not achievable simply by combining two systems of a separate DC electrolysis and an AC time-varying wave. Essentially, the DC current discharging from the electrode surface is independent of the alternating wave in the water when they are operated independently. Under such conditions, the electrode surface is only subjected to a DC discharging current effect and chlorine gas will be generated at the anode surface once it reaches the chlorine liberation potential. In contrast, in the present invention using a DC imposed time-varying frequency pulsed wave, the electrode surface does not discharge DC current. In fact, the electrode surface discharges a pulsating alternating wave but with a DC bias. Under such an alternating current/voltage suppression effect, it changes the electrode over-potential and hence is able to prevent the generation of chlorine gas even at higher applied electrode voltages and electrode discharging currents.

In the prior art system of WO2011/147085, SOx can only be removed at a pH of 2-4, which is the pKa of sulfuric acid, and at a sulphate saturated condition. However, in the present invention, the SOx is removed without the need to operate at a pH of 2-4, which means it does not need to function by using a medium with pH close to pKa to remove the specific gas. In addition, there is no need for the medium to be fully saturated with sulphate for SOx gas phase removal. In the present invention, a low or very low concentration of $Na_2CO_3$ may be added and this will be sufficient to retard and reduce very significantly the acidic $SO_2$ liquid phase reaction and the non-acidic gas phase reaction of $SO_2 \rightarrow SO_4$.

When using such an unsaturated chemical addition scrubbing under the superimposed DC time-varying pulsed wave treatment of the present invention, $SO_2$ is converted into sulphate ions+electric charge, instead of converting the $SO_2$ into its elemental S form, which resolves the elemental sulphur disposal and storage issue. Depending on the gas composition and the type of fuel used for producing the flue gas, $CO_2$ in the flue gas can be converted into bicarbonate, carbonate and/or elemental C forms. Both the sulphates and bicarbonate/carbonate ions produced in use of the invention will be present in the water as well as in the treated gas. However, the majority of these ions are present as gaseous ions in the treated gas. In the treatment of high sulfur diesel fuel emissions, the majority of the $CO_2$ is converted into carbonate/bicarbonate ions present in the water or in the treated gas. For a flue gas containing very low amounts of SOx, such as flue gases produced from distillate diesel fuel oil, some $CO_2$ may be converted primarily into elemental C. Elemental carbon, if produced, will be present only in the water but not in the treated gas. Simultaneously with the $CO_2$ conversion, NOx is converted into only nitrogen gas and oxygen, without producing any nitrates either in the water or in the treated gas.

The superimposed DC pulsed wave treatment increases the water internal energy, including its vibrational and rotational energy, and produces electron-carrying water clusters $(H_2O)n^-$ as reflected in a negative shift in the water oxidation reduction potential (ORP). The electron-carrying water clusters $(H_2O)n^-$ will neutralize the minor acidic H+ produced by the side liquid phase sour gas reactions. If there are more side acidifying liquid phase reactions then either the strength of the superimposed DC time-varying pulsed wave treatment needs to be increased, or mechanical means for charging the water clusters with negative charge water clusters $(H_2O)n^-$ may be introduced to aid the pH correction. Alternatively an alkaline water ion generator may also be employed if the gas load fluctuation is expected to be significant.

The principles of the effects of the present invention are determined from the vibrational and rotational energy effects. In general thermodynamic principles, the free energy determining whether a reaction can proceed consists of enthalpy and entropy components. The bond energy of SOx, $CO_2$ and NOx given in most text books and science papers generally refers to only the enthalpy energy part and assumes there is no change in the entropy part, which is the vibration and rotational energy of the bond. In the gas removal treatment concept of the present invention, the objective is to subject the SOx, $CO_2$ and NOx to a correct vibrational and rotational energy treatment via the water medium to excite the molecules and bonds. Given a correct vibration and rotational energy excitation treatment, SOx, $CO_2$ and NOx can be converted into other compounds or elements at a much lower energy level than using pure thermal energy for conversion. In practice, the changes in vibrational and rotational energies are measureable by FTIR and Raman spectroscopy. In the present invention, the conversion of SOx, $CO_2$ and NOx into their respective excited species is largely based on the vibrational and rotational quantum energy input instead of by thermal enthalpy energy, although the exhaust gas temperature also contributes to the enthalpy energy input.

The present invention first uses a superimposed DC pulsed wave to treat water medium. This wave treatment changes the water internal vibrational and rotational energy which consequently changes the water clustering arrangement, and importantly, the energy is able to be stored in the water for a period of time before it is completely dissipated to the surroundings. When the treated water medium is sprayed into a reaction chamber, the stored energy is released, allowing a gas/water interface reaction to proceed and resulting in the conversion of the pollutant gases into their excited species, compounds, ions or elements at the interface.

The water medium is subjected to excitation by a superimposed DC pulsed wave (SDCPW) in one of the following ways:

1. By passing the SDCPW directly through wire coils with or without ferrite cores placed in the water. This can be used in a metallic or non-metallic tank.
2. By passing the SDCPW directly through wire coils and passing the water through conduits enclosed by the wire coils. Ferrite cores may also be placed in the coil conduit centres to increase the magnetic flux.
3. By using a metallic tank wall as a receiving emitter and one or multiple discharging emitters placed in the tank, either in the centre or distributed in the tank.
4. If two or more emitters are used to treat the water either in a metallic or non-metallic tank, the SDCPW discharging emitter materials are advantageously made of non-consumable materials, for example magnetite, platinized titanium, metal oxide coated titanium etc. If other metal is used, as long as the metal consumption rate and the corresponding design life are calculated and accepted, other metal or conductive materials may also be used.

Additionally, the medium may be mixed with bicarbonates/carbonates, with or without sulphate ions.

According to the invention, the DC biasing unit may be selected from the group consisting of a switch mode DC power supply, an AC to DC converter, a rechargeable DC battery and an inductive diode filter. The device for generating the superimposed time-varying frequency electromagnetic wave may be provided as a prefabricated electronic circuit. The DC biasing unit may provide a variable DC bias voltage or a fixed DC bias voltage according to the actual needs and requirements of a particular situation.

In some cases, the DC bias voltage is selected such that the superimposed time-varying frequency electromagnetic wave is produced to have polar asymmetry or become a unidirectional pulsating wave, or the DC biasing unit is selected to produce the superimposed time-varying frequency electromagnetic wave that has half-wave distortion or full-wave distortion.

The positions of the first and second excitation sites may be varied according to the actual needs and requirements.

In one embodiment of the invention, the AC wave generator comprises a control unit configured to generate a signal having the time-varying frequency AC electromagnetic wave at the desired sweeping time, and one or more bridge-type circuit coupled to the control unit for receiving the signal generated from the control unit, the bridge-type circuit being driven by the received signal to generate and amplify the AC driving signal of the time-varying frequency AC electromagnetic wave, wherein the bridge-type circuit is configured to comprise one or more half-bridge driver integrated circuits (ICs) and one or more Metal Oxide Semiconductor Field Effect Transistors (MOSFETs) coupled to the respective half-bridge driver ICs. In another embodiment, the control unit comprises a programmable integrated circuit (IC) for time-varying the frequency of the AC driving signal, and optionally a stabilizer circuit for stabilizing the AC driving signal.

Advantageously, the frequency of the superimposed time-varying frequency electromagnetic wave is between about 500 Hz and about 1 MHz, preferably between about 100 Hz and about 200 KHz. The sweeping frequency of the superimposed time-varying frequency electromagnetic wave is between about 1 Hz and about 1 KHz, preferably between about 10 Hz and about 500 Hz.

Unlike the methods and systems known in the prior art, the essence of the invention is to use the superimposed time-varying frequency electromagnetic wave to apply onto the treatment medium, that is to be treated and then used to treat flue gases. Therefore, the treatment medium is simultaneously subjected to the effect of the electrical and magnetic fields and to the effect of pulsating DC component. As a result, the current produced in the conductive medium may carry the pulsating positive and negative charged ions, electrons or other charges, which increases the vibration and rotational internal energy of molecule clusters and dissolved ions as well as causing the direct excitation of the medium.

Once the medium is charged, its internal energy will change and it can be monitored by an FTIR and Raman spectroscopy check. When the internal energy of the water medium is charged sufficiently, the medium is transported to the flue gas reaction chamber or tower and is fed in a suitable manner, preferably sprayed, into the chamber to perform the gas phase Conversion reactions.

Optionally the method of the invention includes creating one or more negatively charged and/or electron-carrying $(H_2O)n^-$ water clusters in the treatment water medium.

Further optionally the method of the invention includes effecting a negative shift in the water oxidation reduction potential (ORP) in the treatment water medium.

To have a better understanding of the invention reference is made to the following non-limiting description of the invention and embodiments thereof in conjunction with the accompanying drawings.

BRIEF DESCRIPTION OF THE DRAWINGS

In the drawings, like parts are designated by like reference numerals.

DETAILED DESCRIPTION OF THE PREFERRED EMBODIMENTS

While this invention is illustrated and described in relation to non-limiting preferred embodiments, the system for applying a superimposed time-varying frequency electromagnetic wave to a target object or a target region may be produced in many different configurations, sizes, forms and using many different materials, all within the scope of the invention as claimed.

The term "medium" used herein may refer to a liquid which may be used to provide treatment effects. The medium comprises water, such as sea water or fresh water.

The term "actuator" or "emitter" used herein refers to an element that is able to employ the superimposed time-varying frequency electromagnetic wave to energize the target object or the target region, such that the target object or region is subject to the treatment of the superimposed time-varying frequency electromagnetic wave.

Figure 9A:
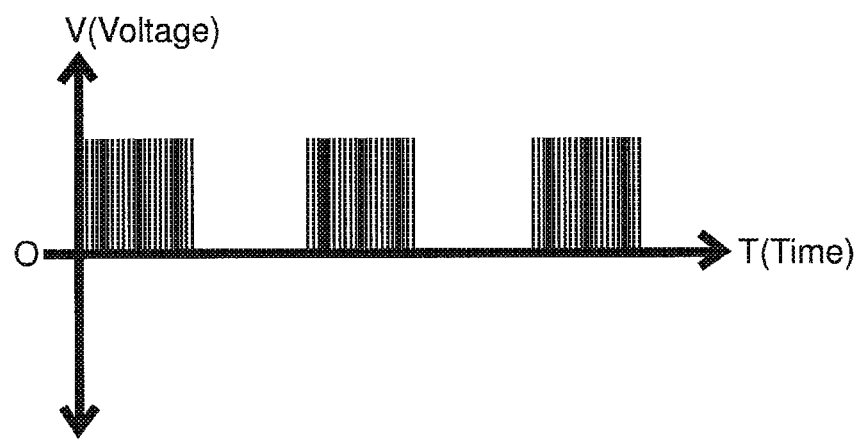
FIGS. 9A and 9B are schematic views of fifth exemplary wave forms of the superimposed time-varying frequency electromagnetic wave.
Figure 9B:
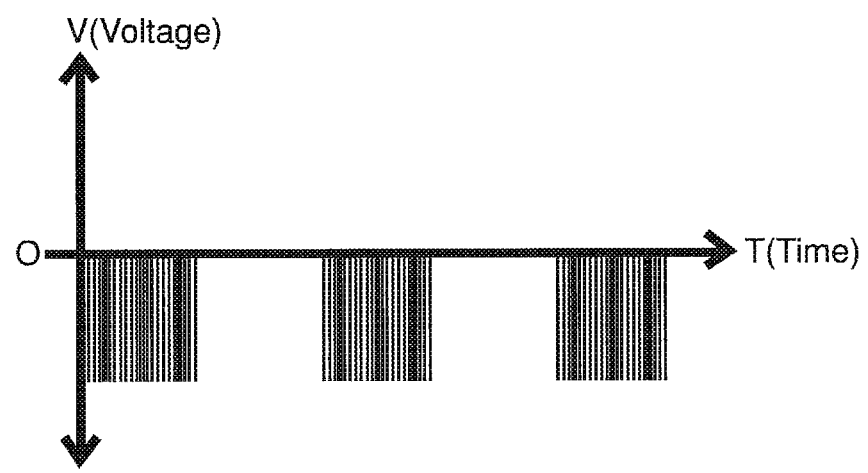
Figure 10:
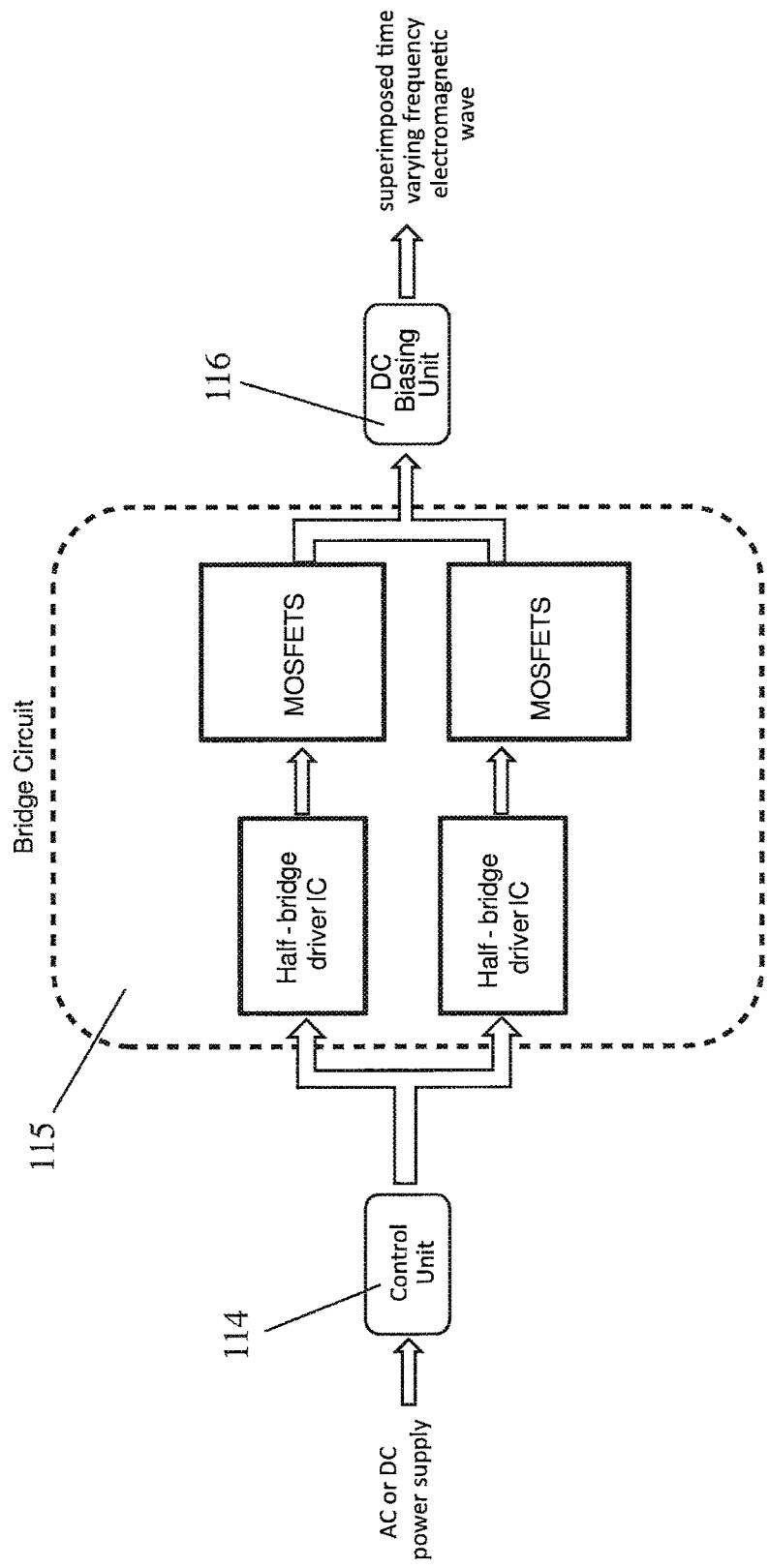
FIG. 10 is a schematic view of an exemplary AC wave generator.
Figure 11:
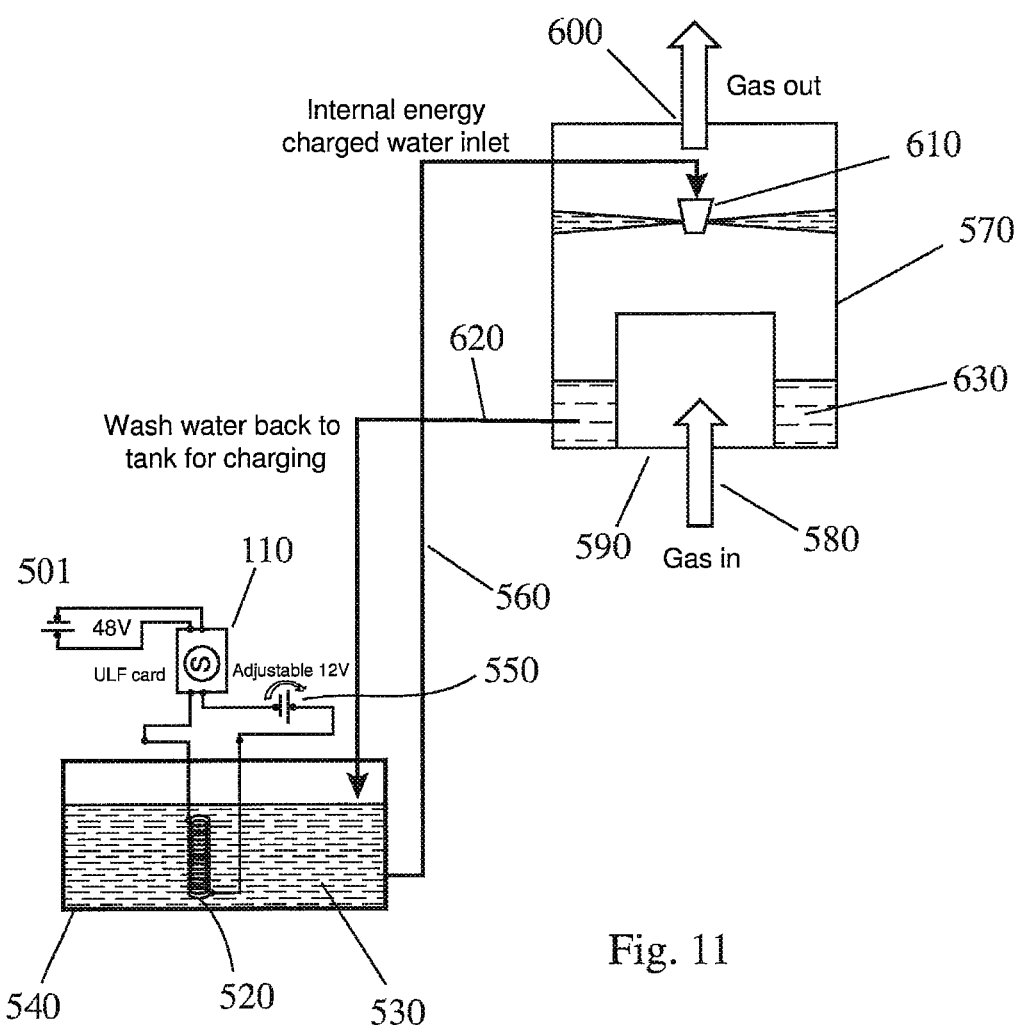
FIG. 11 is a schematic view of an exemplary arrangement of a flue gas treatment system in accordance with the invention.

FIGS. 1 to 10 and the corresponding following description relate to methods and systems for producing a superimposed DC pulsing ionic wave current. FIG. 11 and the corresponding description relate to the specific invention with respect to the methods and systems for treating flue gases.

Figure 1:
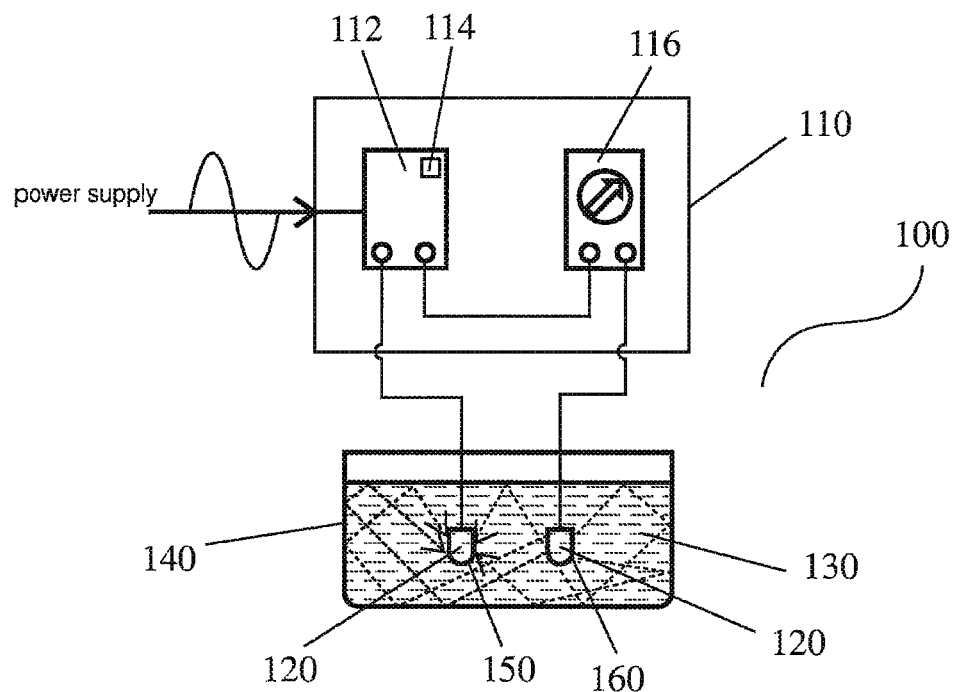
FIG. 1 is a schematic view of an exemplary arrangement of a superimposed time-varying frequency electromagnetic wave system which is constructed in accordance with a first embodiment of the invention.

Referring to the drawings, FIG. 1 provides a system 100 constructed consistent with a first embodiment of the invention for treating a treatment water medium in a container. In this embodiment, the system 100 comprises a device 110 for generating a superimposed time-varying frequency electromagnetic wave. The device 110 comprises an alternating current (AC) wave generator 112 and a direct current (DC) biasing unit 116, which is electrically coupled in series with the AC wave generator 112.

The system 100 further comprises two actuators 120 each electrically coupled with a respective output terminal of the device 110.

As shown in FIG. 1, the actuators 120 are immersed in a conductive liquid 130 (water) contained in a container 140. The actuator of the invention serves to energize the conductive liquid 130 with the superimposed time-varying frequency electromagnetic wave. A first excitation site 150 and a second excitation site 160 are arranged in spaced relation in the liquid. Their connections with the actuators 120 do not cause any problem of short circuiting. The device 110, the actuators 120 and the conductive liquid 130 form together a closed loop circuit. In the embodiment illustrated in FIG. 1, the liquid (water) 130 can be treated for a number of possible purposes, including for use as a treatment medium. The material(s) of the actuators 120 can be any metals, solid conductive materials or materials coated with conductive material, and can be selected from the group consisting of steel, copper, zinc, graphite, stainless steel, titanium, metal oxide coated titanium and the like. The shape(s) of the actuators 120 can be of any geometrical shape including round, square, rectangular, triangular, and may be provided in the form of bars, rods, tubes, dishes, plates, spheres, cubes, hollow articles, solid articles, perforated articles, meshes, etc. or combinations thereof. The actuators 120 may be immersed in the liquid, or can effect a direct excitation on the conductive materials using metallic and non-metallic materials or structures.

The AC wave generator 112 is electrically coupled with a power supply and configured for generating an AC driving signal of AC electromagnetic wave having a time-varying frequency at a desired sweeping time. The power supply can be a DC or AC power supply. In the preferred embodiment of the invention, the power supply is advantageously of DC nature and provides an input DC signal to the AC wave generator 112. As illustrated in FIG. 10, the AC wave generator 112 in this embodiment comprises a control unit 114 configured and programmed to generate a signal having the desired time-varying frequency at the desired sweeping time. This signal generated by the control unit 114 is in the magnitude of milli-amperes.

The AC wave generator 112 further comprises one or more bridge-type circuits 115 electrically coupled to the control unit 114 to receive the signal generated by the control unit 114. The bridge-type circuit 115 is configured to be driven by the received signal to generate and amplify an AC driving signal in the magnitude of milli-ampere to ampere, for example. This AC driving signal corresponds to the time-varying frequency AC electromagnetic wave having the desired sweeping time and is delivered to the DC biasing unit 116 for superposition on the DC output. The bridge-type circuit 115 comprises two sets of sub-circuits in parallel as illustrated. Each of the sub-circuits comprises a half-bridge driver integrated circuit in connection with two or more MOSFETs. If the main AC source is applied, an AC-to-DC converter may be embedded in the AC wave generator 112 for converting the AC power supply to a DC power supply which is then applied to the control unit 114. The power supply applies to the AC wave generator 112 a voltage according to the actual applications, for example between about 12V and about 200V.

The various electronic components in the AC wave generator 112 may be provided on a printed circuit board (PCB). If an AC-to-DC converter or rectifier is needed, it may also be mounted on the PCB as a compact structure.

As described above, the control unit 114 generates the time-varying frequency signal at the desired sweeping time. The sweeping time is selected to ensure the liquid has the correct time frame to expose it to the corresponding frequency for the correct exposure time period. For different applications, a wide range of frequencies may be selected. Preferably, the frequency of the superimposed time-varying frequency electromagnetic wave used in the invention may be in the range of 100 Hz to 1 MHz, preferably in the range of 100 Hz to 200 kHz, with the sweeping frequency between about 1 Hz to 1 kHz, preferably in the range of 10 Hz and 100 Hz. The wave form of the superimposed time-varying frequency electromagnetic wave can be square, triangular, rectangular, sinusoidal or other forms. In this embodiment, the control unit 114 comprises a programmable integrated circuit (IC) for time-varying the frequency of the AC driving signal, and a stabilizer circuit for stabilizing the AC driving signal.

The direct current (DC) biasing unit 116 is electrically coupled in series with the AC wave generator 112 and configured for producing a DC output with a predefined DC bias voltage which may be varied or fixed. The DC biasing unit 116 is programmed such that the DC output is mixed with the amplified AC driving signal received from the AC wave generator 112 to produce the superimposed time-varying frequency electromagnetic wave where the time-varying AC wave is riding on the predefined DC bias voltage. In this embodiment, the DC biasing unit 116 is a switch mode DC power supply. A rechargeable DC battery or AC-to-DC rectifier power supplies are possible for the DC biasing unit 116. When the rechargeable DC battery is used as the DC biasing unit 116, an extremely pure DC output can be generated and is particularly suitable for some applications requiring an extremely pure DC source.

It is advantageous that the DC bias voltage matches the voltage and frequency of the AC pulsating wave coming from the AC wave generator 112. In general the DC bias voltage is lower than the time-varying pulsating wave voltage. The DC bias voltage is therefore adjustable to suit the different onsite treatment requirements. In some cases, the DC bias source is configured to be able to take an inflow of current/voltage if the time-varying pulsating AC wave should surge into the DC bias source.

One feature of the invention is that the unique superimposed time-varying frequency electromagnetic wave can be generated only when the right combination of the AC wave generator 112, the DC biasing unit 116 and the actuators 120 are connected to one another in series.

The superimposed time-varying frequency electromagnetic wave of the invention is different from the simple combination of applying a DC component and a separate time-varying frequency AC wave. If a DC component is separately applied to a time-varying frequency AC wave, there is no superimposed DC pulsed wave produced or presented in the liquid. The DC component is static and would exert separately its own DC effect, and the separate time-varying frequency AC wave, which is balanced in positive and negative amplitude without the DC characteristics, would exert its own effect too.

Figure 5A:
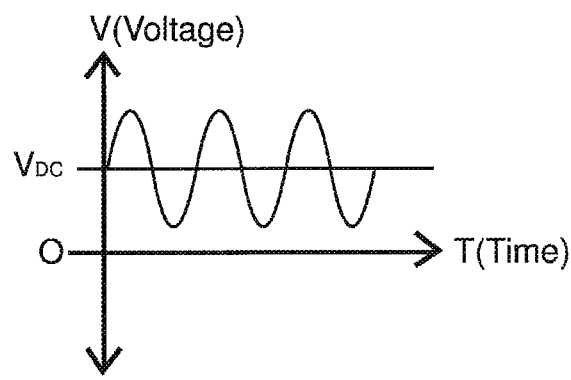
FIG. 5A to 5C are schematic views of first exemplary wave forms of the superimposed time-varying frequency electromagnetic wave.
Figure 5B:
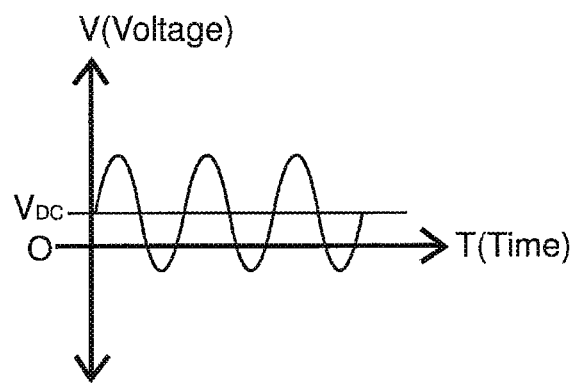
Figure 5C:
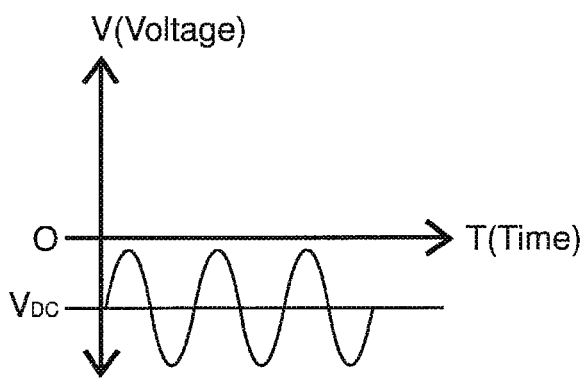
Figure 6A:
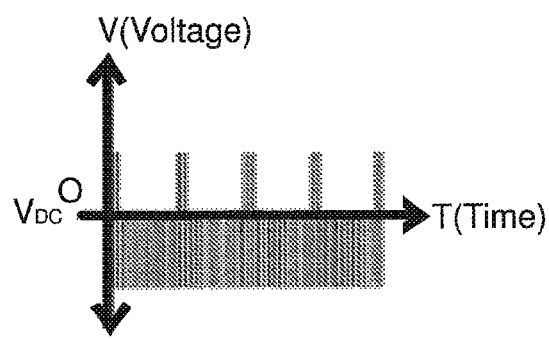
FIG. 6A to 6D are schematic views of second exemplary wave forms of the superimposed time-varying frequency electromagnetic wave.
Figure 6B:
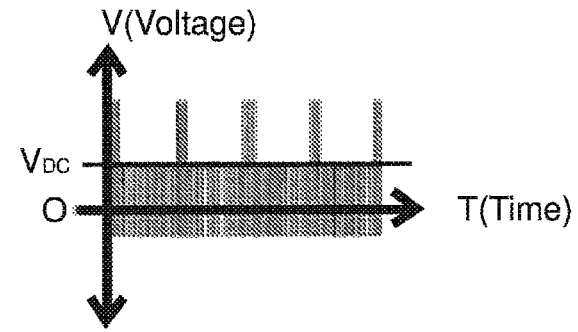
Figure 6C:
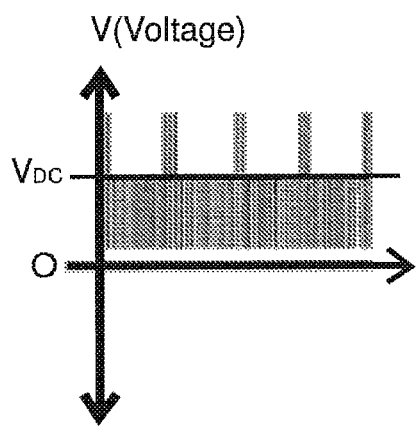
Figure 6D:
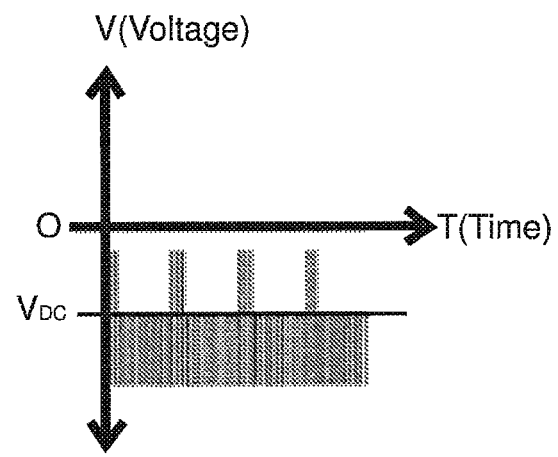
Figure 7A:
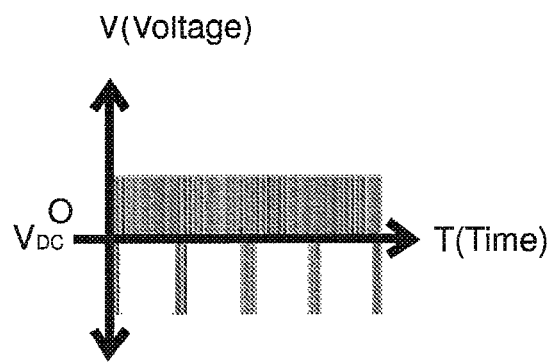
FIG. 7A to 7D are schematic views of third exemplary wave forms of the superimposed time-varying frequency electromagnetic wave.
Figure 7B:
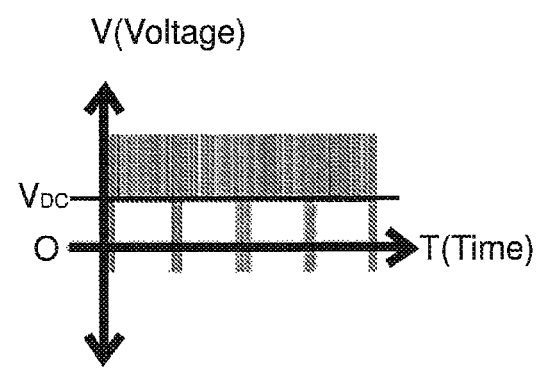
Figure 7C:
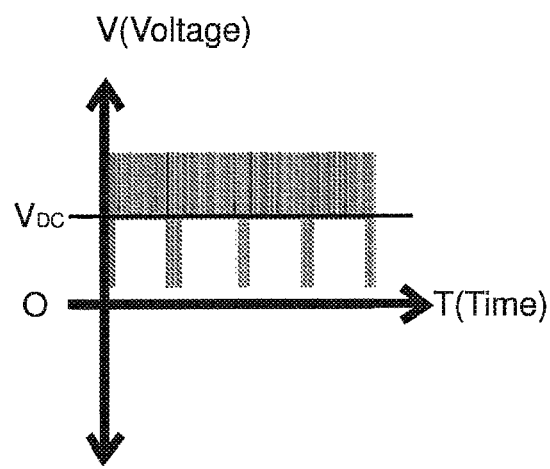
Figure 7D:
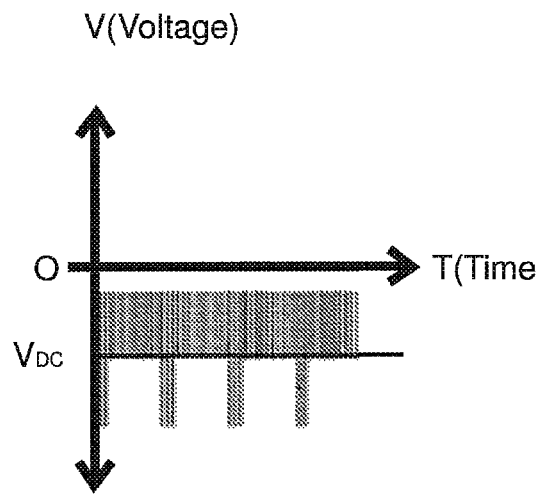

When the input DC signal is provided to the AC wave generator 112, the generator 112 generates and amplifies an AC driving signal corresponding to the time-varying frequency AC electromagnetic wave at a specific sweeping time, which is a wave for example in sine wave form (see FIGS. 5A to 5C). The amplified AC driving signal of the time-varying frequency AC alternating electromagnetic wave is delivered to the DC biasing unit 116 where the DC bias output having a predefined a bias voltage $V_{DC}$ is mixed with the AC driving signal. The result of such a mix is an AC-DC superimposed signal where the time-varying AC electromagnetic wave is riding on the DC preset level to produce the superimposed time-varying frequency electromagnetic wave (hereinafter called "DAC wave") having a mixed-frequency voltage. In the DAC wave, the DC component is not static but rather travels in a pulsating and time-varying manner along with the AC component. Therefore there will be a pulsing ionic wave current containing the DC component produced in the liquid 130, i.e. there are physical ions or charges flowing in the liquid 130, which is an important and distinguishing feature of the invention. After being subject to such an ionic wave current, the internal energy including the vibrational and rotational energy of the liquid is changed, which results in the liquid molecule clusters carrying electrons. This can change the clustering arrangement of the liquid molecule, and more importantly, the energy can be stored in the liquid for a period of time before it is completely dissipated to the surroundings. The stored energy in the liquid plays an important role for the various treatment effects.

In some cases, it is necessary to control the DAC wave to have a controllable DC superimposition magnitude. In general the maximum limit of the DC imposition magnitude is determined by the safety operating limits and is controlled to be less than the pulsating wave peak voltage. The negative and positive polarity may be set permanently or be controlled by switching the terminal polarity at a pre-programmed frequency or manually. The polarity of the DAC wave is characterized mainly by the DC component and depends on the polarity of the DC component and the overall loop power source current flow direction. The average voltage of the DAC wave can be seen as having two components, one being the AC amplitude and the other being the DC bias voltage. Each of these magnitudes has its own function, but also they often provide a synergy effect to each other. In some scenarios, the DC magnitude (i.e. the DC bias voltage) is important, for example in providing sufficient current density covering the structure surfaces to be protected in corrosion control to meet full corrosion protection criteria. Therefore, the AC amplitude voltage and the DC bias voltage may be adjusted and selected according to the actual applications required of the DAC wave.

In this embodiment, the polarity of the DAC wave would be changed asymmetrically as shown in FIGS. 5A to 5C. In FIG. 5A the DAC sine wave never goes negative, in FIG. 5C the DAC sine wave never goes positive, and in FIG. 5B the DAC sine wave spends more time positive than negative. One of the methods for changing the polarity of the DAC wave is to configure the DC biasing unit to give different DC bias voltages $V_{DC}$ so that the polarity of the DAC sine wave may be varied, if desired.

Figure 8A:
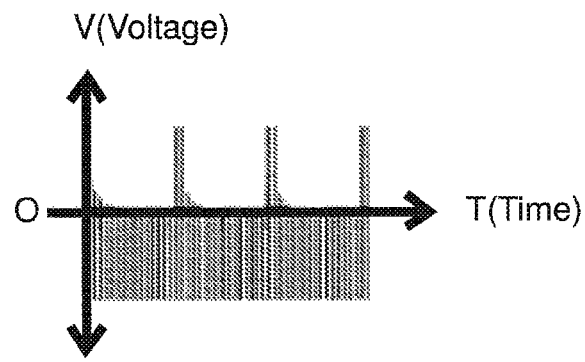
FIG. 8A to 8C are schematic views of fourth exemplary wave forms of the superimposed time-varying frequency electromagnetic wave.
Figure 8B:
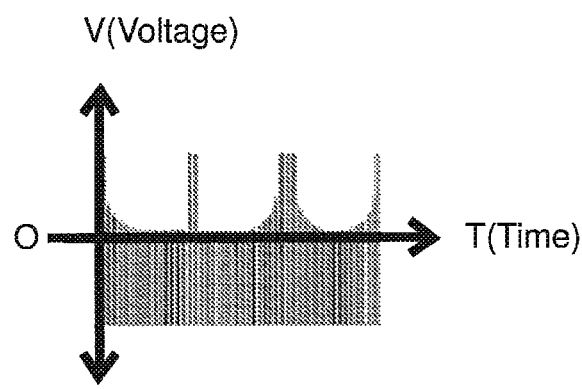
Figure 8C:
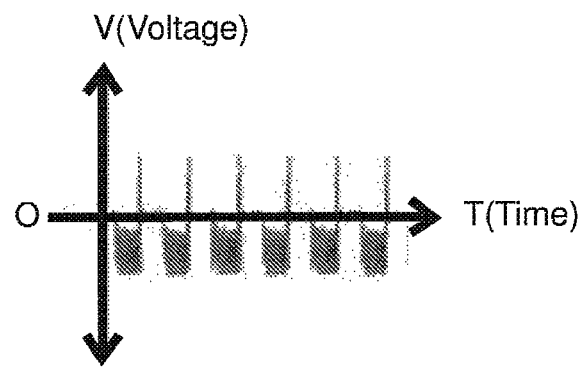

Non-sine wave forms are possible for the invention, for example square wave, rectangular wave, triangular wave or the like. FIGS. 6A to 6D and FIGS. 7A to 7D illustrate some possible variations of the wave forms. In certain applications of the DAC wave, a distorted waveform instead of a regular waveform could result in a better effect control. In FIGS. 8A to 8C, there are illustrated some examples of wave distortion. The distorted wave may be obtained by filtering diodes, filter circuits, or the AC wave generator may be programmed to produce many other possible distorted waveforms.

Figure 2:
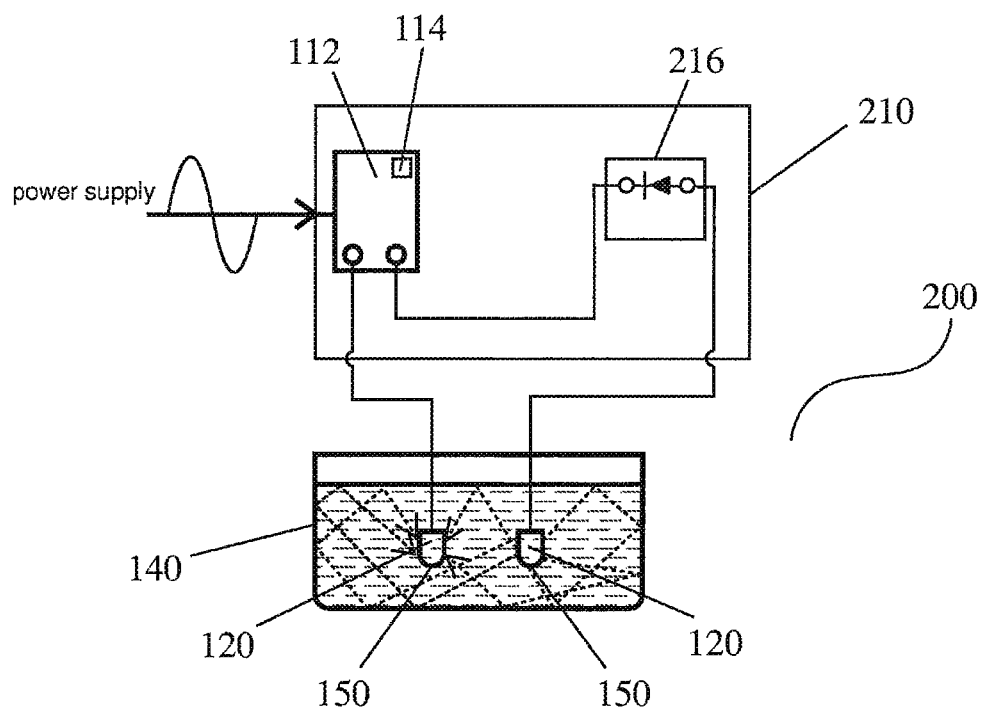
FIG. 2 is a schematic view of an exemplary arrangement of a superimposed time-varying frequency electromagnetic wave system which is constructed in accordance with a second embodiment of the invention.

Now turning to FIG. 2, there is illustrated a system 200 constructed consistent with a second embodiment of the present invention. The system 200 of this embodiment is structurally same as the one shown in the first embodiment above, except that an inductive diode filter 216 is selected as the DC biasing unit. The inductive diode filter 216 functions to filter all or part of the positive or negative half of the time-varying frequency AC electromagnetic wave to yield an asymmetrical wave having only positive component or negative component. In this embodiment, the DAC wave is biased to have an amplitude toward only the positive or negative direction and generate the wave forms as shown in FIGS. 9A and 9B.

Figure 3A:
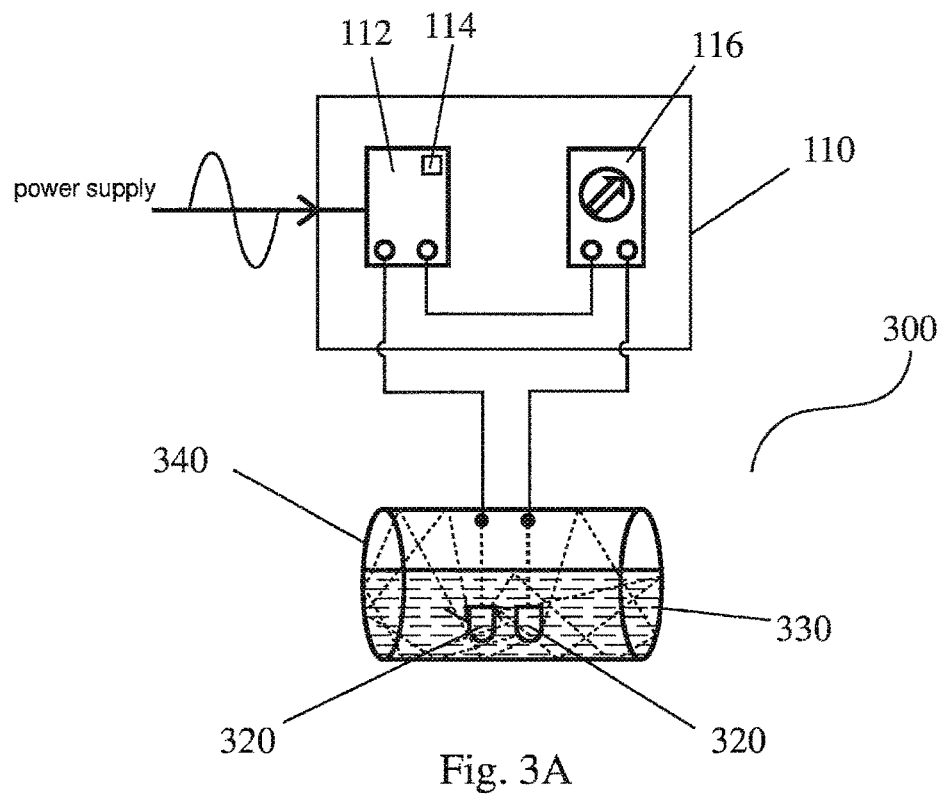
FIGS. 3A and 3B are a schematic view of an exemplary arrangement of a superimposed time-varying frequency electromagnetic wave system which is constructed in accordance with a third embodiment of the invention.
Figure 3B:
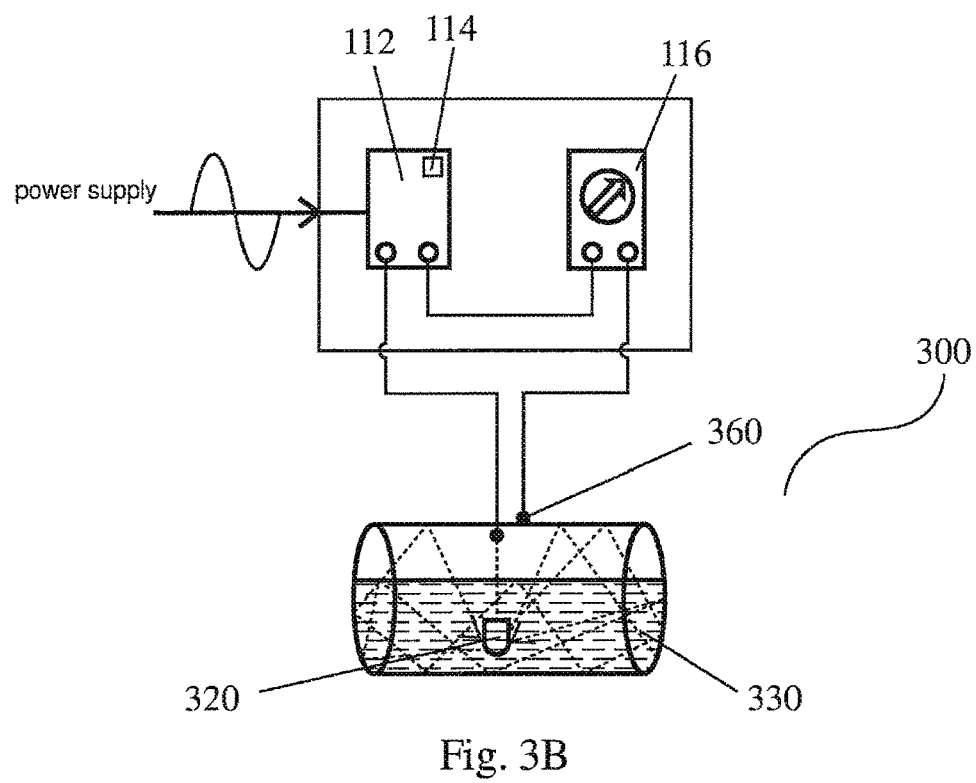

FIGS. 3A and 3B illustrate a system 300 constructed consistent with a third embodiment of the present invention. The system 300 of this embodiment is structurally the same as the one shown in the first embodiment described above, except that the pipe 340 and the fluid such as water 330 flowing in the pipe 340 form together to a target region to be treated. In FIG. 3A, the pipe 340 is made of a non-metallic material so the two actuators 320 are placed to connect with the first and second excitation sites located in the fluid. An inductor may be arranged to connect with the one of the excitation sites, if needed, to enhance the electromagnetic effect. In FIG. 3B, the pipe 340 is made of a metallic material. In this case, one actuator 320 is placed in the fluid. The other excitation site is positioned on the pipe 340 itself, and this excitation site is directly electrically coupled with the output terminal of the device for generating the DAC wave. The DAC wave can go randomly towards different directions in the liquid 330 and in the pipe 340, which ensures that many blind spots or zones in the liquid and in the pipe can be reached by the DAC wave and therefore are subject to the DAC wave treatment.

Figure 4A:
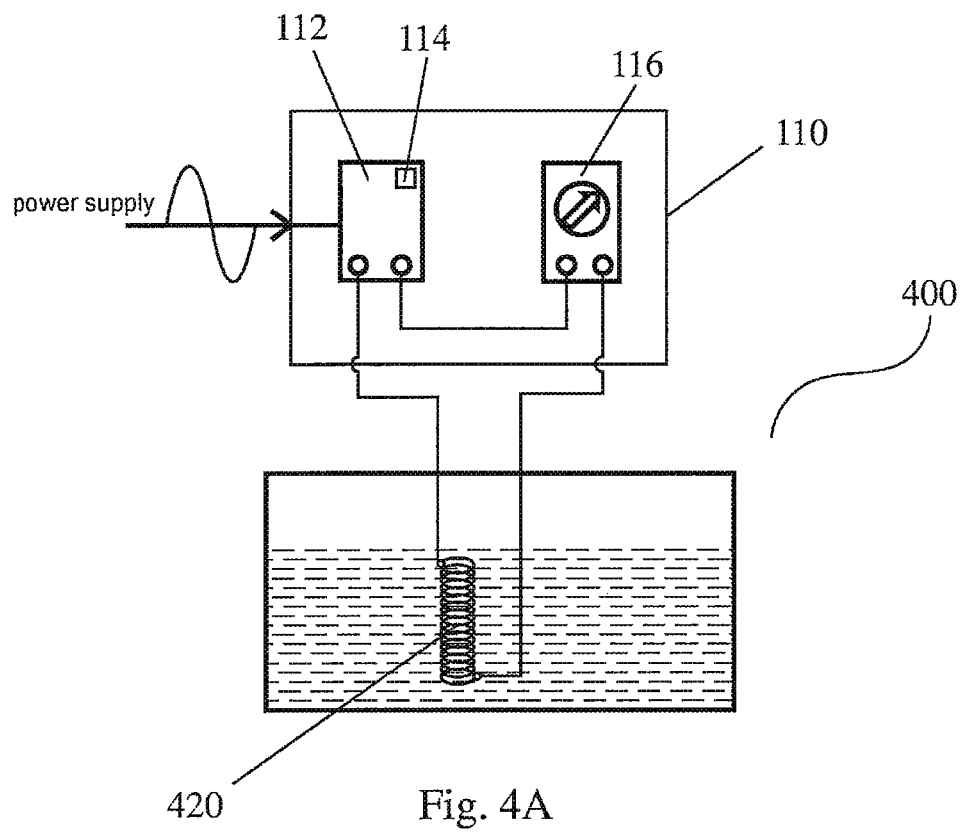
FIGS. 4A and 4B are a schematic view of an exemplary arrangement of a superimposed time-varying frequency electromagnetic wave system which is constructed in accordance with a fourth embodiment of the invention.
Figure 4B:
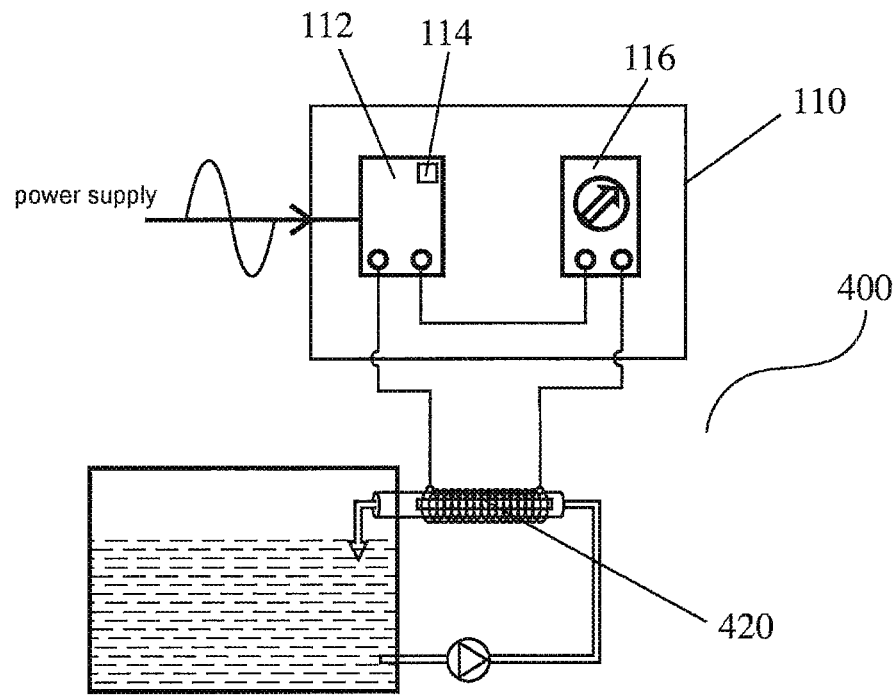

FIGS. 4A and 4B illustrate a system 400 constructed consistent with a fourth embodiment of the present invention. The system 400 of this embodiment is structurally the same as the one shown in the first embodiment above, except that the actuators are provided in the form of a coil 420 to excite the target region. Ferrite may be incorporated within the coil or outside the coil to enhance the magnetic field effect. Likewise, the coil 420 may be immersed in the liquid (FIG. 4A) or above the liquid (FIG. 4B).

The systems discussed in the above embodiments can produce the required DAC wave uniquely. The right system can be chosen for a specific application for the desired treatment effect.

The present invention provides a specific application of the time-varying DC pulsating wave described above for treatment of flue gases for the removal of pollutants.

FIG. 11 illustrates one embodiment of the present invention. Water medium 530, such as sea water, fresh water or estuary water, is introduced into a container 540. The water 530 is subjected to excitation by a superimposed DC pulsed wave (SDCPW). A power supply 501 provides power to device 110 for producing a superimposed DC pulsed wave (SDCPW) as described above. An emitter 520 is placed in the water 530 and a circuit is formed to enable excitation by the SDCPW. The emitter 520 is illustrated as a coil but different arrangements are possible including a coil with a ferrite core, two emitters in the water, or an emitter in the water and an emitter formed on the container wall. Alternatively the water medium may be excited in an external chamber (not shown) in which the water medium flows from the container 540, through the external chamber where is it excited by the SDCPW, and back into the container 540.

In the embodiment described, the DC input voltage to the SDCPW card 110 typically ranges from 12 to 48V. A higher or lower voltage than this range may be applied if required but generally treatment efficacy is not optimized outside this range. The SDCPW wave form can be square, sine, triangular or other random forms and the output frequency range may be 100 Hz to 1 MHz, preferably in the range of 500 Hz~200 KHz range. This range of frequency is further time-varied at any selected sweeping frequency between 1 and 1,000 Hz, and preferably 10~100 Hz. The sweeping frequency may also be random.

To produce the superimposed DC pulsating wave to the coils or emitters 520, one of the output terminals of the SDCPW card 110 is further connected to an adjustable DC source 550. This DC source 550 may be an electronically rectified type DC source. In conventional electronics practice, a DC battery would not generally be connected to the SDCPW card output terminal as this may affect the DC battery. However, it has been found that by connecting the SDCPW card DC output to an electronically rectified type DC source, not only is it able to superimpose a DC biased voltage on the AC time-varying wave, it also does not damage the DC imposing power source. This concept of connection is an unusual practice in electronic circuitry.

The positive and negative terminal connections of the SDCPW power source may also be alternated or reversed depending on the water internal charging changes needed to achieve the optimum charging. The superimposed DC pulsed time-varying wave that is produced is then sent to the coils or emitters 520 placed in the water 530 in the container 540 (or external chamber) to provide the treatment effect to the water 530.

The SDCPW wave produced in the water can be any suitable waveform such as square, triangular, sine or other random or distorted waveforms but it is Produced in a DC biased pulsating manner. The DC superimposed pulsating frequency is of the order of 100 Hz to 1 MHz and is preferably in the range of 500~200 KHz. The full range of the pulsating wave frequency range is also time varied at any selected sweeping frequency between 1 to 1,000 Hz and preferably 10~100 Hz.

The DC superimposing voltage is varied to achieve a good internal charging effect but it is kept at a level below the SDCPW card applied voltage. The DC power source 501 polarities for connecting to the SDCPW card 110 and the emitter 520 may also be reversed to achieve the optimum energy charging changes in the water, as indicated by FTIR and Raman Spectroscopy.

In this invention, the production of chlorine or hydrogen gas is prevented or controlled by regulating the relative magnitude of the AC pulsed voltage magnitude and the DC voltage magnitude. Under a pure DC electrolysis system, even at very low electrolysis driving voltage, chlorine gas or hydrogen gas will be generated. This is due to the electric current constantly discharging at the anode surface in DC electrolysis. However, in the present invention, the electrode surface is subjected to an alternating suppressing current in the order of kHz frequency. This alters the electrode overpotential and suppresses the generation of chlorine gas. Additionally, use of iridium and tantalum mixed oxides and coated titanium as the electrode can also enhance the suppression of chlorine gas generation.

In the present invention, the DC superimposing component is kept to the lowest possible level to keep the tank surfaces at a water potential of less than −1.0 V vs an Ag/AgCl reference cell level, in order to avoid hydrogen gas generation. All the methods of the invention will avoid the generation of hydrogen and chlorine if seawater is used. This contrasts with usual DC electrolysis systems in which a high current is required to produce the required water treatment effect which leads to unavoidable generation of hydrogen and chlorine gas. In this embodiment of the invention, the DC superimposing component is also minimal in order to further mitigate gas generation.

If the emitter 520 comprises an inductor coil then coil materials may be copper, aluminum, silver or other conductive material. The inductor coils may also incorporate a ferrite core to increase the magnetic flux field strength produced by the coils. The coil arrangement can also be in a flat planar concentric circular arrangement or in other coil shape arrangements in a single plane or in three dimensional forms.

The treated water 530 is passed via a pipe 560 to a flue gas treatment chamber 570. Flue gases 580 are introduced to the chamber 570 at an inlet 590 and the treated gases exit from the chamber via an outlet 600. The treated water 530 is introduced to the chamber 570 via a spray nozzle 610.

Yet another important feature in this invention is the use of a mechanical means to produce a negative charge on water clusters forming negative charged water clusters $(H_2O)n^-$ to neutralize the H+ ions produced by the minor side liquid phase acidifying reaction. This corrects, maintains or prevents a drop in the water/medium pH. As shown in FIG. 11, the mechanical means of increasing the negative charge and hence water pH comprises the spray nozzle 610. The nozzle may comprise a direct straight or spiral spraying method and this induces negative charge on the sprayed water.

Alternatively (not shown), a similar effect may be achieved by bubbling the water with a gas such as nitrogen, oxygen, air etc. This is also able to charge the water with negative charge by producing $(H_2O)n^-$ negatively charged water clusters in water. The negatively charged water clusters will then able to neutralize the acidifying H+ ions and control the water pH. In this way no chemicals are needed for correcting the acidifying water pH. In general, the finer the bubbling size or increased air/water interfacing areas for increasing contact chances will produce faster pH rise effect.

Other means of cavitation action which involve both the water and gas interface interactions are also able to produce negatively charged water clusters for neutralizing the H+ ions. These actions include stirring, propeller rotational action, two phase air/water cyclones, cavitation implosion etc.

Once the flue gases 580 in the chamber 570 have been contacted and affected by the sprayed treated water medium 530, the used wash water 630 collects at the base of the chamber 570 and is returned to the container 540 via a pipe 620 to be recharged and reused.

In one embodiment, if required, the pH of the wash water 630 may be corrected by using the bubbling means in the wash water pipe 620 as well as in the container 540 or other suitable locations depending on the site condition and the ease of installation.

The spraying of water in the reaction tower 570 may use a spiral nozzle or other type of nozzle 610 that is able to provide a good water screen to have good contact with the gas with minimum gas leakage. The chamber or tower 570 may be arranged horizontally or vertically, with the water screen, in a horizontal, vertical or inclining position.

Depending on the required quality of the final treated gas, the treated gas may be exhausted from the chamber or may be further treated in similar chambers 570 arranged in series to reduce further the pollutant load content.

If the gas removal requires a high percentage of gas removal efficiency, the above treatment arrangements may be repeated by a series of additional reaction chambers to further treat the cleaned gases from the first reaction chamber. The wash water for the additional chamber or chambers may be taken from the same water treatment tank or separate water treatment tanks. When multiple reaction chambers are used, the chambers may be stacked in series or arranged separately depending on the site integration conditions.

The invention thus provides a system and a method for applying a superimposed time-varying frequency electromagnetic wave for the treatment of flue gases which is very simple, relatively inexpensive, and more environmentally sound than the prior art.

Preferences and options for a given aspect, feature or parameter of the invention should, unless the context indicates otherwise, be regarded as having been disclosed in combination with any and all preferences and options of all other aspects, features and parameters of the invention.

While the embodiments described herein are intended as exemplary systems and methods, it will be appreciated by those skilled in the art that the present invention is not limited to the embodiments illustrated. Those skilled in the art will envision many other possible variations and modifications by means of the skilled person's common knowledge without departing from the scope of the invention; however, such variations and modifications should fall into the scope of this invention.

The invention claimed is:

1. A method for removing gas components SOx, NOx, and $CO_2$ together from flue gas, comprising the steps of:
generating a superimposed DC time-varying pulsed wave by superimposing a direct current on a low frequency time-varying pulsating electromagnetic wave signal, in which an AC driving signal with time-varying frequency is riding on a DC output with a predefined DC bias voltage;
providing a treatment medium comprising water;
treating the treatment medium by subjecting it to the generated superimposed DC time-varying pulsed wave so as to excite the treatment medium, wherein the excitation causes a flow of ionic current having a DC component traveling in a pulsating and time-varying manner in the treatment medium and induces vibration of electrons and molecules of the treatment medium;
passing the thus treated treatment medium into a flue gas chamber containing flue gas, wherein the treated treatment medium affects the gas components and converts the gas components respectively to one or more of sulphates, nitrogen, oxygen, bicarbonates, carbonates and carbon; and
removing the converted gas components with used treatment medium or treated flue gas from the flue gas chamber.

2. The method of claim 1, wherein negative charge is created in the treatment medium by a mechanical charger.

3. The method of claim 2, wherein the treat medium is negatively charged by bubbling a gas through the medium to produce $(H_2O)n^-$ negatively charged water clusters prior to the medium being passed into the flue gas chamber.

4. The method of claim 2, wherein the treatment medium is sprayed into the flue gas chamber.

5. The method of claim 4, wherein the treatment medium is negatively charged by the spraying action as the treatment medium is sprayed into the flue gas chamber.

6. The method of claim 1, wherein the treatment medium is negatively charged by a physical cavitation action selected from the group consisting of stirring, cyclone, and cavitation implosion prior to the medium being passed into the flue gas chamber.

7. The method of claim 1, wherein the treatment medium comprises water and one or more treatment chemicals selected from the group consisting of sulphates, bicarbonates, carbonates, and nitrates.

8. The method of claim 7, wherein the treatment medium comprises water and 1 to 25% $Na_2CO_3$ or other positive-ion carbonates.

9. The method of claim 7, wherein the treatment medium comprises water and 1 to 25% $Na_2SO_4$ or other positive-ion sulphates.

10. The method of claim 1, wherein the treatment medium is collected from the flue gas chamber and recycled by using the superimposed DC time-varying pulsed wave to treat the collected treatment medium, and passing the collected treated treatment medium into the chamber containing flue gas.

11. The method as claimed in claim 1, wherein the frequency of the superimposed DC time-varying pulsed wave is between about 500 Hz and about 1 MHz.

12. The method as claimed in claim 1, wherein the superimposed DC time-varying pulsed wave has a sweeping frequency between about 1 Hz and about 1 KHz.

13. The method as claimed in claim 1, wherein the generated superimposed time-varying DC pulsed wave current is a biased alternating DC current having fixed frequency, time-varying frequency or randomly varying frequency.

14. The method as claimed in claim 1 including creating one or more electron-carrying $(H_2O)n^-$ water clusters in the treatment medium.

15. The method as claimed in claim 1 including effecting a negative shift in water oxidation reduction potential (ORP) in the treatment medium.

16. A system for removing gas components SOx, NOx, and $CO_2$ together from flue gas, the system comprising:
a container containing a treatment medium;
a device for generating a superimposed DC time-varying pulsed wave and having at least two output terminals, the device comprising an alternating current (AC) wave generator for generating an AC driving signal of AC electromagnetic wave having a time-varying frequency at a desired sweeping time, and a direct current (DC) biasing unit electrically coupled in series with the AC wave generator and for producing a DC output with a predefined DC bias voltage, the DC biasing unit being configured such that the DC output is mixed with the AC driving signal to produce the superimposed DC time-varying pulsed wave in which the time-varying frequency AC wave is riding on the predefined DC bias voltage, and an emitter provided at one or each of both of a first excitation site and a second excitation site in the treatment medium or in the treatment medium and the treatment medium container and electrically coupled in series with the output terminal of the device, for transmitting the superimposed DC time-varying pulsed wave to the treatment medium, wherein the device is electrically coupled in series with the first excitation site and the second excitation site in the treatment medium or in the treatment medium and the treatment medium container directly or through the emitter, such that the superimposed DC time-varying pulsed wave is applied to the treatment medium or in the treatment medium and the treatment medium container, and wherein the DC bias output and the AC driving signal are superimposed such that the superimposed DC time-varying pulsed wave is able to induce a flow of ionic current having a DC component travelling in a pulsating and time-varying manner in the treatment medium or in the treatment medium and the treatment medium container and effect induced vibration of electrons and molecules of the treatment medium and creation of electron-carrying $(H_2O)n^-$ clusters in the treatment medium;
a chamber containing flue gas and having a treatment medium inlet and a treatment medium outlet;
means to pass the thus treated treatment medium through the inlet into the flue gas chamber; and
means to remove the treatment medium from the water medium outlet.

17. The system as claimed in claim 16 further including a mechanical charger to negatively charge the treatment water medium, wherein the means to pass the treatment water medium into the flue gas chamber comprises a spray system, and the mechanical charger forms a part of the spray system to negatively charge the treated treatment water medium.

18. The system as claimed in claim 16, wherein the DC biasing unit is selected from the group consisting of switch mode DC power supply, an AC to DC converter, a rechargeable DC battery and an inductive diode filter.

19. The system as claimed in claim 16, wherein the DC bias voltage is selected such that the superimposed DC time-varying pulsed wave is produced to have polar asymmetry or become a unidirectional pulsating wave.

20. The system as claimed in claim 16, wherein both the first and second excitation sites are positioned in the treatment medium in a spaced relation, or one of the first and second excitation sites is positioned on the treatment medium container, and the other is positioned in the treatment medium.

* * * * *